United States Patent
Hinnant

[11] 3,900,825
[45] Aug. 19, 1975

[54] VIBRATOR-TYPE REFLECTION SEISMIC SURVEYING

[75] Inventor: Harris O. Hinnant, Houston, Tex.

[73] Assignee: Texaco Inc., New York, N.Y.

[22] Filed: Oct. 24, 1973

[21] Appl. No.: 409,202

[52] U.S. Cl.................. 340/15.5 TS; 340/15.5 TA
[51] Int. Cl............................................. G01v 1/22
[58] Field of Search......... 340/15.5 TS, 15.5 TA, 17

[56] References Cited
UNITED STATES PATENTS

| | | | |
|---|---|---|---|
| 3,062,315 | 11/1962 | Herzog | 340/15.5 TS |
| 3,219,971 | 11/1965 | Cole | 323/101 |
| 3,259,878 | 7/1966 | Mifsud | 340/15.5 TA |
| 3,283,295 | 11/1966 | Montgomery | 340/15.5 TS |
| 3,288,242 | 11/1966 | Loeb | 340/15.5 TS |
| 3,316,996 | 5/1967 | Ball et al. | 340/15.5 TS |
| 3,375,896 | 4/1968 | Beddo | 340/15.5 TA |
| 3,698,508 | 10/1972 | Landrum, Jr. | 340/15.5 TC |
| 3,733,584 | 5/1973 | Pelton et al. | 340/15.5 TA |
| 3,806,864 | 4/1974 | Broding et al. | 340/15.5 TS |

Primary Examiner—Maynard R. Wilbur
Assistant Examiner—H. A. Birmiel
Attorney, Agent, or Firm—T. H. Whaley; C. G. Ries; Henry C. Dearborn

[57] ABSTRACT

Seismic surveying of the reflection type, employing mechanical vibrators to generate a seismic signal. Performance of the vibrators needs to be monitored frequently, and by sending a coded control signal when a given vibrator sweep is instigated, a predetermined parameter of a given vibrator is monitored and recorded with the received seismic sweep signals.

4 Claims, 5 Drawing Figures

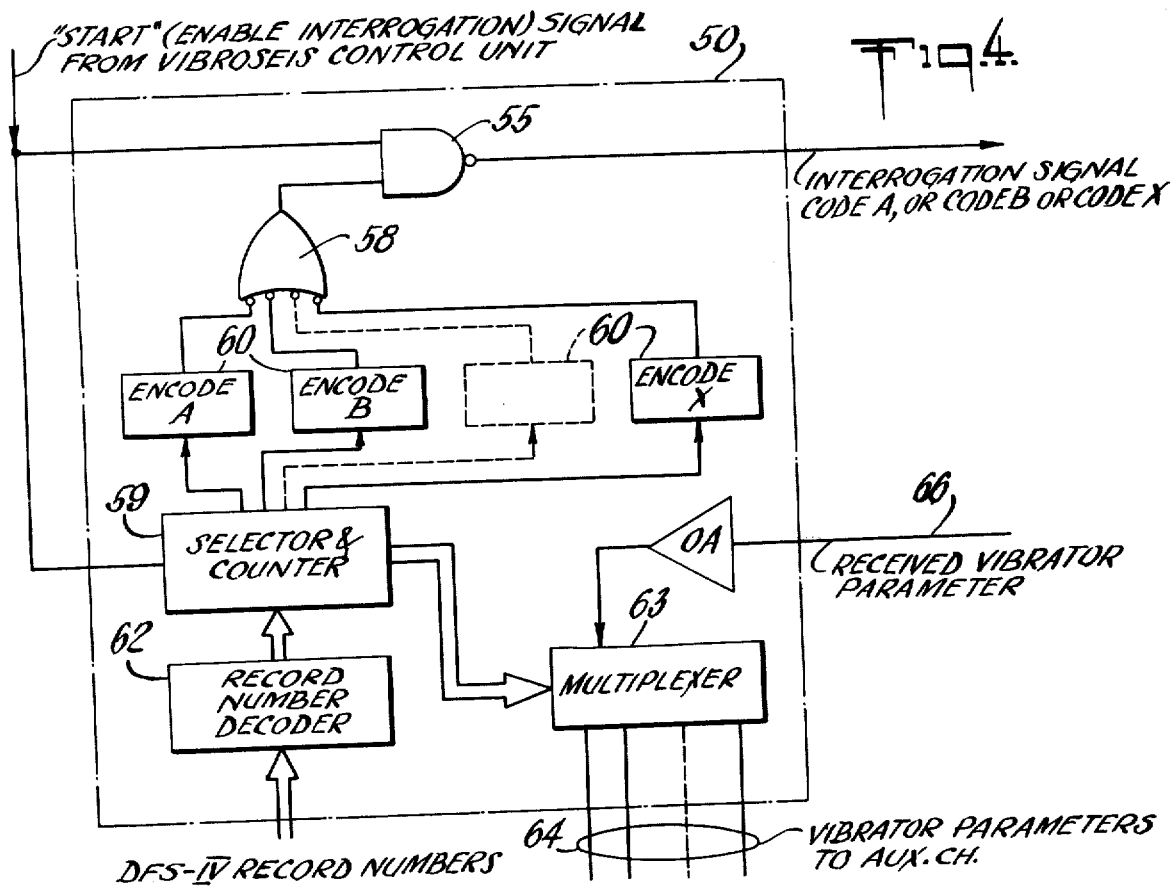
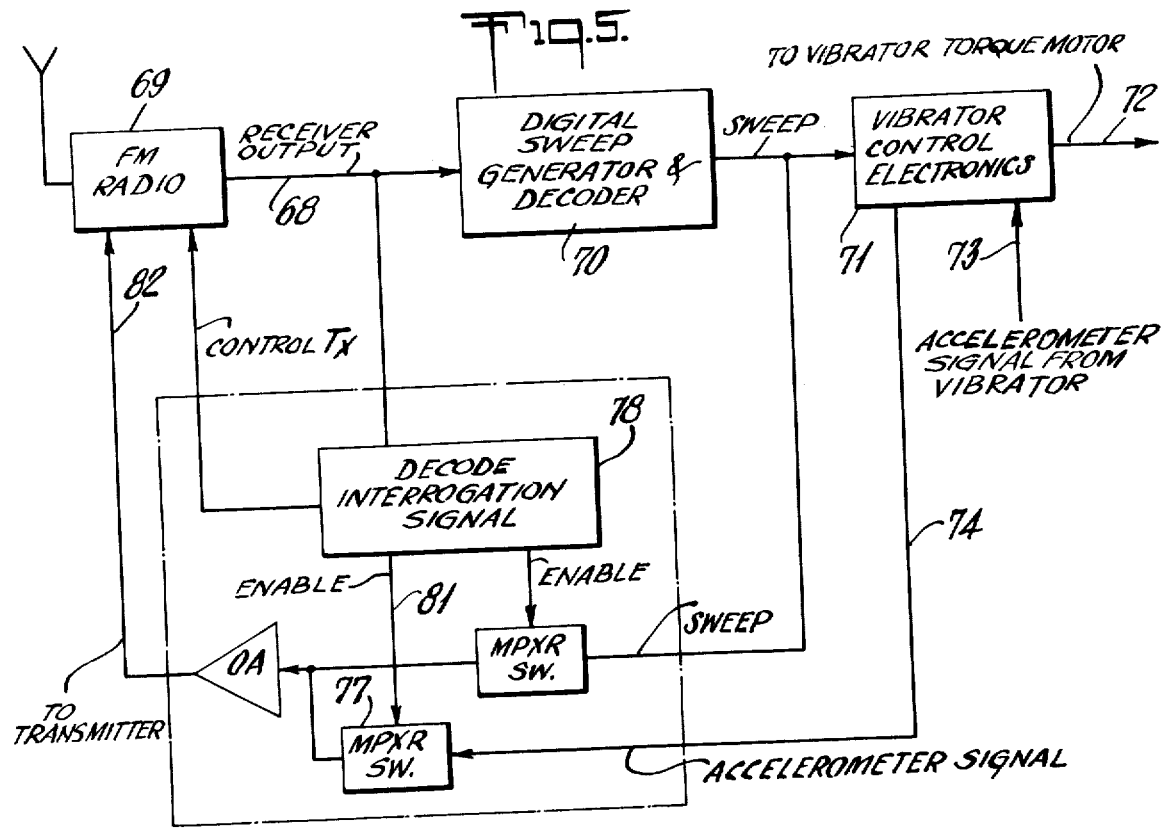

VIBRATOR-TYPE REFLECTION SEISMIC SURVEYING

BACKGROUND OF THE INVENTION

1. Field of the Invention

This invention concerns seismic surveying in general. More specifically, it relates to an improvement in reflection seismic surveying of the vibrator type.

2. Description of the Prior Art

Heretofore, in connection with the special type of reflection seismic surveying known as the vibrator type, there has been employed a time-consuming procedure for monitoring the parameters of vibrator units. Since it is of paramount importance in vibrator-type seismic surveying that all of the vibrator units are exactly synchronized with one another and with a reference sweep signal, the monitoring of outputs in relation to the primary sweep signal has been very important. Consequently, monitoring must be carried out at quite frequent intervals.

One of the ways in which such monitoring was accomplished in the past was that of running a test procedure while locating vibrators and a recording system close enough to one another for making direct electrical cable connections. Of course, that procedure required considerable time and disruption of the normal procedures used. Consequently, that procedure was ordinarily only carried out once each day at the maximum, and often less frequently.

Another prior procedure was that of operating each individual vibrator in succession close to a group of seismic detectors, so that the operating characteristics of each vibrator might be recorded, and so monitored. While this procedure was faster than the other, it also involved the disruption of normal surveying procedures while, in addition, it introduced new unknowns into the tests. Another drawback was the lack of directly monitoring the sweep generator start times of the vibrator units.

Consequently, it is an object of this invention to provide a system such that a selected parameter of individual vibrator units may be recorded at the same time as each recording of the seismic data as developed from a given set of vibrator outputs.

SUMMARY OF THE INVENTION

Briefly, this invention concerns a combination with vibrator-type reflection seismic surveying, wherein there is a recording unit that has a spread of seismic detectors electrically connected thereto for recording seismic signals at the surface of the earth, and that has at least one vibrator unit which includes a mechanical seismic wave generator for projecting seismic signals into the earth. Also, each of said recording and vibrator units has an electrical sweep signal generator for generating a frequency sweep having a predetermined duration and frequency characteristic. Also, said recording unit and said vibrator each have means for remote communication and timing means for starting said sweep signal generators simultaneously. And, the said recording unit has means for generating a control pulse for activating all of said timing means. In combination with all of the foregoing, the invention concerns an improvement which comprises means for generating a signal in accordance with at least one parameter of each of said vibrator units, and remote communication means for transmitting said parameter signal to said recording unit. It also comprises code means associated with said recording unit for selecting a predetermined one of said vibrator unit parameter signals for transmission, whereby a selected vibrator unit may have a predetermined parameter monitored with each recording of seismic signals generated by said vibrator unit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 4 is a block diagram illustrating some details of the vibrator monitor control system which is shown in FIG. 3; and FIG. 5 is a simplified block diagram which illustrates equipment that is carried by each of the vibrator units, in accordance with this invention.

DESCRIPTION OF THE PREFERRED EMBODIMENT

The type of seismic surveying to which this invention applies has been clearly described under the title "Continuous Signal Seismograph" in an article published in Geophysics magazine, Vol. XXV, No. 1 (February, 1960) at pages 95–105. Since that time, practical equipment has been developed for carrying out that technique, e.g., as described by brochure published by Seismograph Service Corporation, P.O. Box 1590, Tulsa, Oklahoma. Also, more recently, some special electronic equipment has been made commercially available by the Pelton Company, Inc., P.O. Box 1415, Ponca City, Oklahoma 74601. The latter (electronic equipment) includes a digital sweep generator to provide an adjustable and accurate sweep signal so that difficulties inherent in radio transmission of a master sweep signal could be overcome. However, it has been found necessary when using such equipment to monitor the vibrator performance at rather frequent intervals and, in the past, this required disruption of the normal procedure employed in running a vibrator-type seismic survey.

In order to understand this invention, it must be related to the system and/or procedure which was formerly employed using the type of equipment indicated in which an individual sweep signal generator is located at each of the vibrators as well as one at the recording station.

Figure 1:
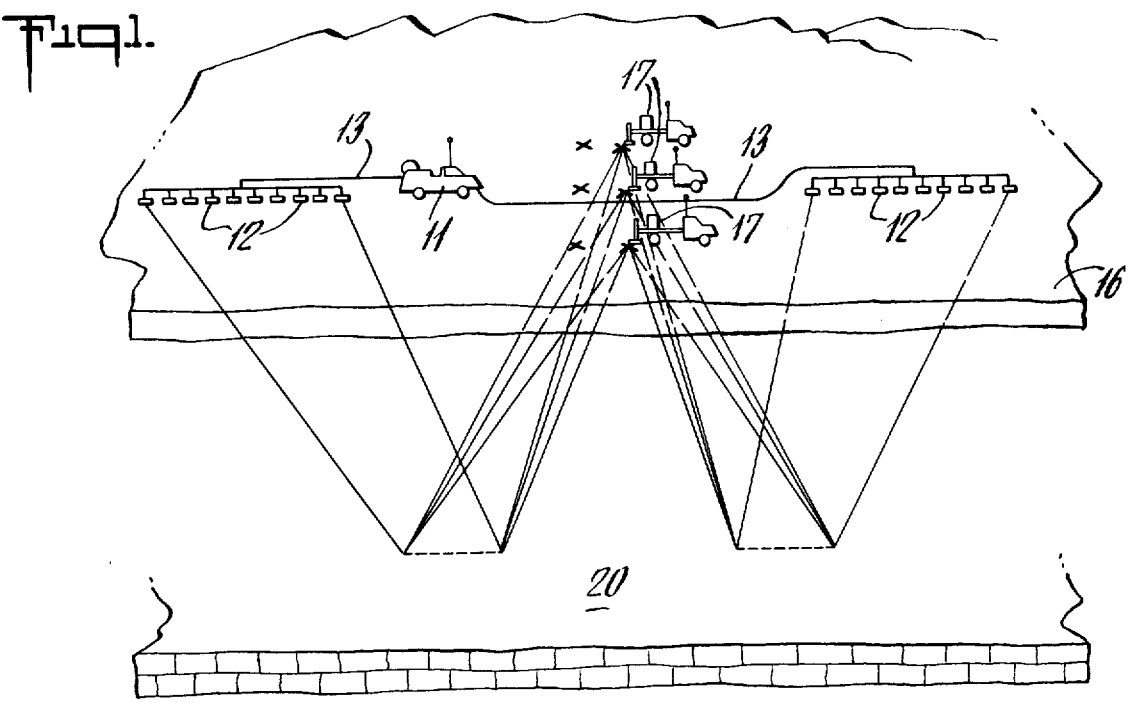
FIG. 1 is a schematic showing of typical equipment, and it indicates the fundamentals involved in vibrator-type reflection seismic surveying.

Referring to FIG. 1, there is illustrated a typical vibrator-type surveying procedure where standard inline profiling is being carried out. There is a recording unit 24 (indicated in FIG. 2) mounted on a recording truck 11, and there is connected to the unit a plurality of seismic detectors 12 by means of electrical cables 13. The recording unit receives and records seismic energies which have been generated at the surface of the earth 16 by means of a plurality of vibrator units 17. These are usually mounted on trucks, as indicated.

In general, the technique involves generating a frequency sweep of seismic energies which has predetermined duration and frequency characteristics. This is done by first electronically developing the desired sweep signal, and then by applying it to control the mechanical vibration of a large mass that is in contact with the surface of the earth. Such energy then travels down into the earth's subsurface and is reflected from any discontinuities, e.g., a subsurface layer 20 illustrated.

In order to obtain the desired information with the vibrator technique, it is necessary that all sweep signals be synchronized for simultaneous generation of the seismic energy and, in addition, for processing the data which is recorded. In connection with the latter, there must be a sweep signal recorded that corresponds to the sweep signal applied to the vibrator units. This enables a correlation with the seismic signals that are recorded, in order to have the final data which is presented appear in a form that is substantially similar to the type of recorded data that was obtained from the earlier well-known type of seismic reflection surveying. Such earlier technique employed short-time seismic energy output which was developed by means such as explosive detonation.

As indicated above, this invention relates to a vibrator-type seismic system wherein an electrical sweep signal generator is employed at the recording station and also at each of the vibrator stations. The procedure prior to this invention involved simultaneously generating the sweep signals in synchronism, and control was initiated at the recording station where a timing signal was transmitted by radio to all of the vibrator units while being applied to the sweep signal generator at the recording station at the same time. This is indicated in FIG. 2 which shows in general block-diagram form the elements that are employed.

Elements of a recording unit 24 are shown within the dashed lines. These are mounted on a recording truck 11. They include a radio 25, a vibrator monitor control and encoder 26, and an oscillogram and tape recording unit 27. It should be noted that the latter records the monitored parameter signals and data as received by the radio 25, in accordance with this invention. Also, although not directly indicated in FIG. 2, the unit 27 receives signals from the detectors 12 via cables 13, as indicated more specifically in FIG. 3.

Figure 2:
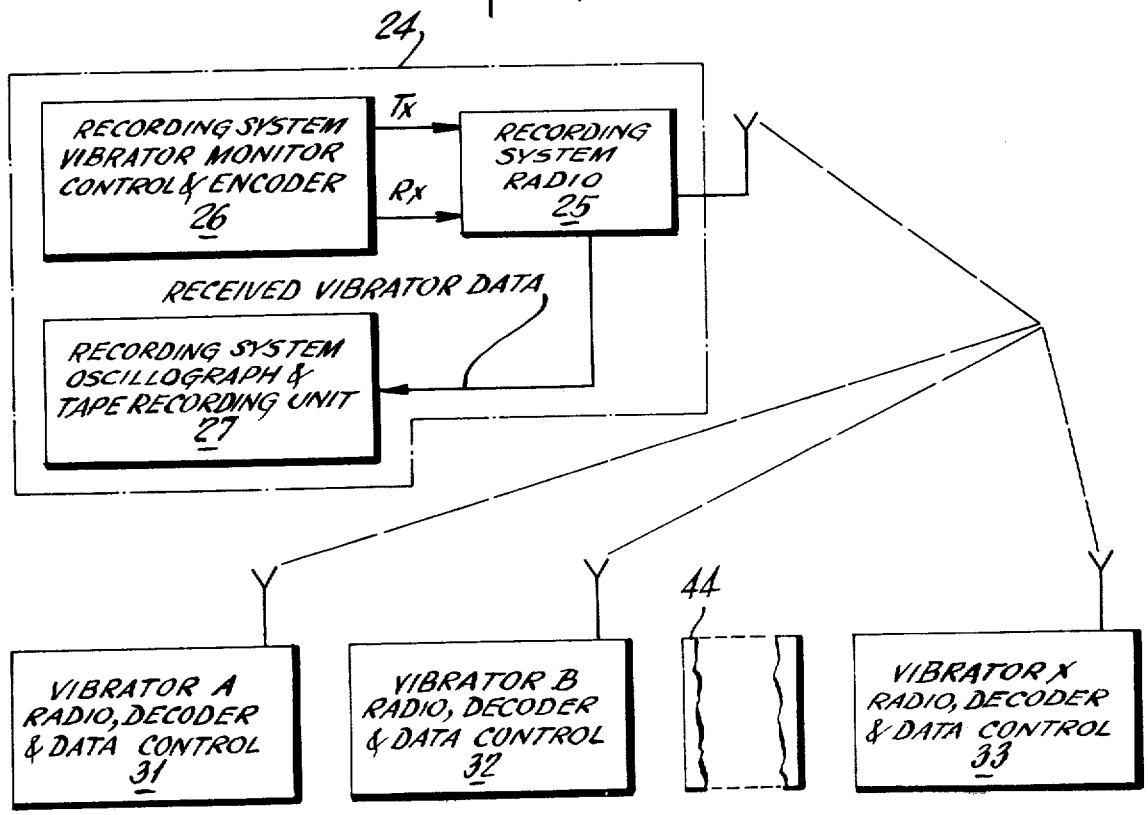
FIG. 2 is a block diagram illustrating the basic instrumentation employed in carrying out vibrator-type seismic surveying, to which this invention applies.

FIG. 2 also illustrates in general the equipment associated with each of the vibrators 17. Thus, there is a radio and a decoder and data control unit for each of the vibrators, as indicated by the captions on blocks 31, 32 and 33.

Figure 3:
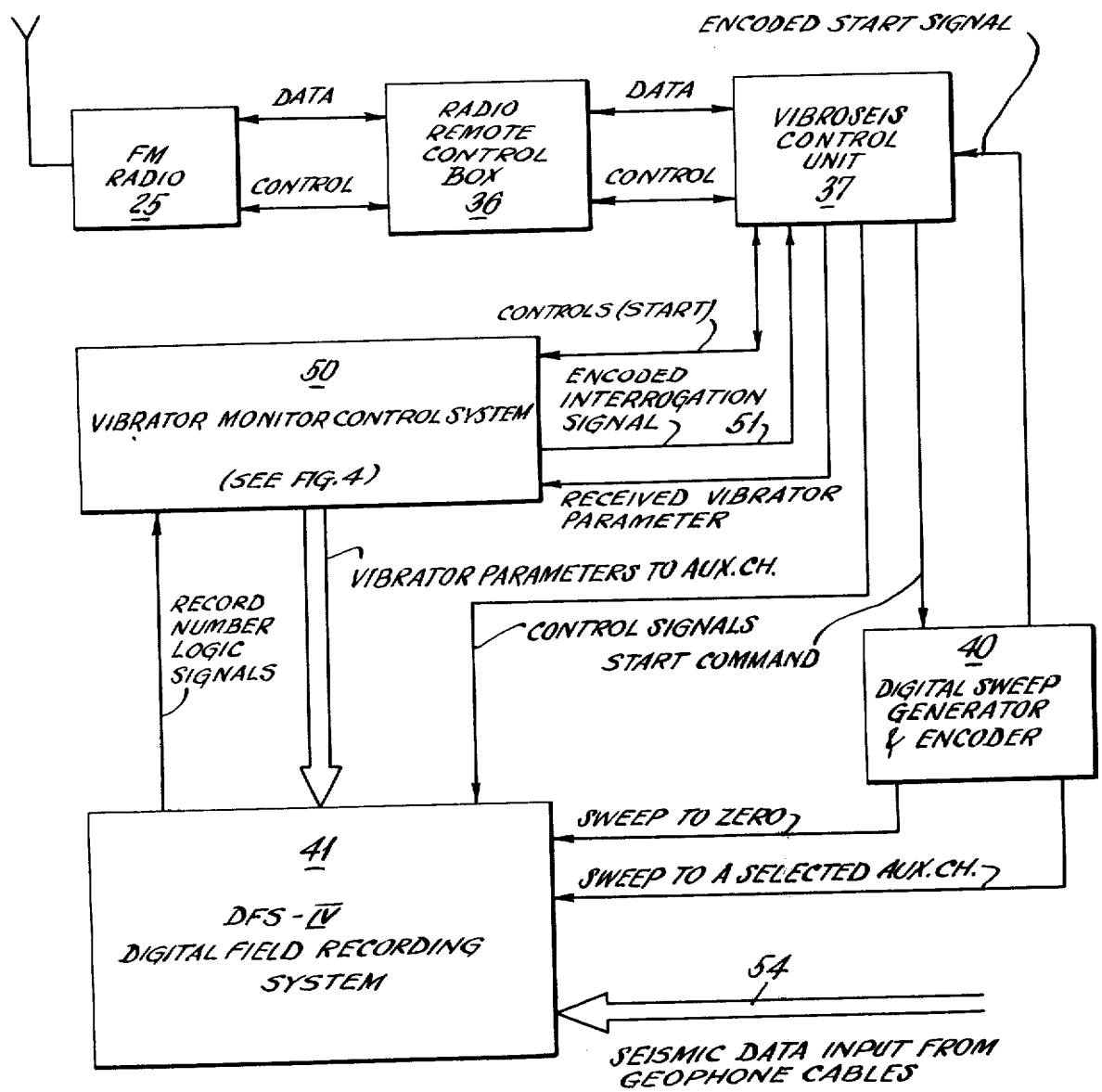
FIG. 3 is a simplified block diagram illustrating equipment that is carried by a recording truck, in accordance with this invention.

FIG. 3 illustrates some of the additional elements that are included as part of the whole recording unit 24, shown in FIG. 2. Thus, in addition to the radio 25, there is a remote-control box 36 that has operative connections with a control unit 37. Control unit 37, in turn, has operative connections with a digital sweep generator and encoder 40. There is also a recording system 41 which might take various forms but is preferably a digital type of field recording system, e.g., one manufactured by Texas Instruments, Inc. and designated DFS-IV. It will be observed that there are operative connections from the sweep generator and encoder 40 to the recording system 41 in order to record the sweep signal that will be used in the above-described correlation.

It will be understood that while only three of the vibrator blocks 31, 32 and 33 are illustrated in FIG. 2, there might be any number thereof. This is indicated by a dashed-line block 44 between blocks 32 and 33.

As indicated above, the FIG. 3 system shows in greater detail some of the elements that are part of the recording unit 24. Thus, and in accordance with this invention, there is also a vibrator monitor control system 50. Some of the elements thereof are shown in more detail in FIG. 4. The operative connections with the rest of the recording unit are indicated in FIG. 3. Also, it will be noted that, in addition to the conventional start signal for initiating all of the vibrator sweeps, there is a special encoded signal transmitted over a circuit 51 which goes to the control unit 37 and from there to be transmitted by radio to all of the vibrators 17, simultaneously. In addition, it will be observed that there is indicated a provision for electrically connecting the detectors 12 (FIG. 1) via cables 13 (FIG. 1) to the recording system 41. This is schematically indicated by a double-line arrow 54 that has the caption "SEISMIC DATA INPUT FROM GEOPHONE CABLES."

As mentioned above, FIG. 4 shows in block-diagram form some of the elements that are employed in the monitor control system 50 which is illustrated in FIG. 3. There is an AND gate 55 that has an input connected to the "start" signal that activates the vibrators. The other input is from an OR gate 58 that passes one of the encoded selection signals, depending upon which of a plurality of encoders 60 is selected by a selector and counter unit 59 that may be controlled by a decoder 62. At the same time, the unit 59 controls a switching unit 63 (entitled "multiplexer") that will determine which of a corresponding plurality of channels 64 in the recording unit will receive the monitored parameter signal. This monitored signal is received over a circuit 66 which carries an appropriate caption.

FIG. 5 illustrates in greater detail various of the elements that are located on each of the vibrators 17. There is a radio 69 which has an output circuit 68 connected to a digital sweep generator and decoder 70. The sweep signal that is generated goes to a circuit 71 which carries the caption "VIBRATOR CONTROL ELECTRONICS."

It will be understood from the above general description that a primary function of the circuit 71 is to apply the electrical sweep signal to the vibrator torque motor, and this is indicated by an arrow 72 in FIG. 5. However, there is also included in the vibrator control electronics a circuit for handling the desired parameter output, or outputs. For example, there may be output signals from an accelerometer (not shown) that are introduced over a circuit connection 73 into the control electronics 71. From there, these signals are carried via a circuit connection 74 to a switching element 77. This switch 77 is controlled by a decoding unit 78 so that if the coded signal being received is the one for the vibrator unit under consideration, there will be an enable signal on a circuit 81. That signal will close the circuit of the switch 77 and, consequently, it will transmit the parameter being monitored back via a circuit 82 to the radio 69. Then, of course, the parameter signals will be transmitted back via radio communication to the recording unit.

It will be understood by anyone skilled in the art that any of the block-diagram elements which are not already clearly set forth in detail, might take various forms which are well-known to those skilled in this art. For example, the decoders mentioned may be in accordance with a linear integrated circuit that is manufactured by Signetics and described under its designation "SE/NE 567" entitled "Tone Decoder Phase Locked Loop."

OPERATION

A typical operation in accordance with this invention may be described with reference to the drawings. It will be assumed that the selected parameter to be monitored is the output of the accelerometer located on vibrator A of the vibrators 17. This means that at the same time as a record is being made by the recording system 41 of the seismic data from the geophone cables 54, and of the sweep generator 40 signals, there will have been selected by the unit 59 a channel 64 which was reserved for parameters of the vibrator A. Consequently, the output signals from that accelerometer will be transmitted via the circuit 73, the control electronics 71, the connection 74, switch 77, and the circuit 82 to radio 69 and then back to the recording system 41 via the vibrator monitor control system 50 and the control unit 37 in reverse after receipt by the radio 25 and remote-control box 36.

It will be appreciated that other parameters might be selected for monitoring. Also, it may be noted that the arrangement may be such as to have any sequence of monitoring of the vibrators and to have the monitoring continue in the same or a varied succession, if desired.

While the above invention has been described in considerable detail and in accordance with the applicable statutes, this is not in any way to be taken as limiting the invention, but merely as being descriptive thereof.

I claim:

1. In vibrator-type reflection seismic surveying, in combination with a recording unit having a spread of seismic detectors electrically connected thereto for recording seismic signals received at the surface of the earth, at least one vibrator unit including a mechanical seismic-wave generator for projecting seismic signals into the earth, each of said recording and vibrator units having an electrical sweep signal generator for generating a frequency sweep having a predetermined duration and frequency characteristic, said recording unit and said vibrator each having means for remote communication and timing means for starting said sweep signal generators simultaneously, said recording unit having means for generating a control pulse for activating all of said timing means, the improvement comprising means for generating a signal in accordance with at least one parameter of each of said vibrator unit, remote communication means for transmitting said parameter signal to said recording unit, and code means associated with said recording unit for selecting a predetermined one of said vibrator unit parameter signals for transmission, whereby a selected vibrator unit may have a predetermined parameter monitored with each recording of seismic signals generated by said vibrator unit.

2. The invention according to claim 1, wherein said parameter is the output of an accelerometer on said vibrator unit.

3. The invention according to claim 1, wherein said parameter is the output of said electrical sweep signal generator on said vibrator unit.

4. The invention according to claim 1 including a plurality of said vibrator units, wherein said parameter signals are monitored in a predetermined sequence.

* * * * *